Jan. 8, 1929.  J. L. DRAKE  1,698,492

SHEET GLASS APPARATUS

Filed Oct. 19, 1925

INVENTOR.
John L. Drake.
Frank Fraser.
ATTORNEY.

Patented Jan. 8, 1929.

1,698,492

UNITED STATES PATENT OFFICE.

JOHN L. DRAKE, OF TOLEDO, OHIO, ASSIGNOR TO THE LIBBEY-OWENS SHEET GLASS COMPANY, OF TOLEDO, OHIO, A CORPORATION OF OHIO.

SHEET-GLASS APPARATUS.

Application filed October 19, 1925. Serial No. 63,277.

The present invention relates to sheet glass apparatus.

An important object of the invention is to provide an apparatus wherein a sheet of glass may continuously be drawn from a mass of molten glass, the apparatus including means for protecting the sheet as it is drawn from heat present around the molten glass from which it is drawn.

Another object of the invention is to provide a furnace and a mass of molten glass from which a sheet may be continuously drawn, and includes means for protecting the sheet from heat and gases issuing from the furnace, and adapted to permit an exposure of the molten glass to the atmosphere just prior to its entrance into the sheet being drawn.

Still another object of the invention is to provide a tank furnace and draw pot of this nature, said draw pot having associated therewith lip-tiles, the central portions of which are arranged relatively further away from the sheet than the ends thereof.

Still another object of the invention is to provide an apparatus of this nature including lip-tiles having arcuated lips and arcuated heat-absorbing shields associated with the said lips to protect the sheet from heat and gases and to permit exposure of the surface glass being drawn into the sheet, the exposure being greatest at the central portion.

Other objects and advantages of the invention will become apparent during the course of the following description.

Figure 1:
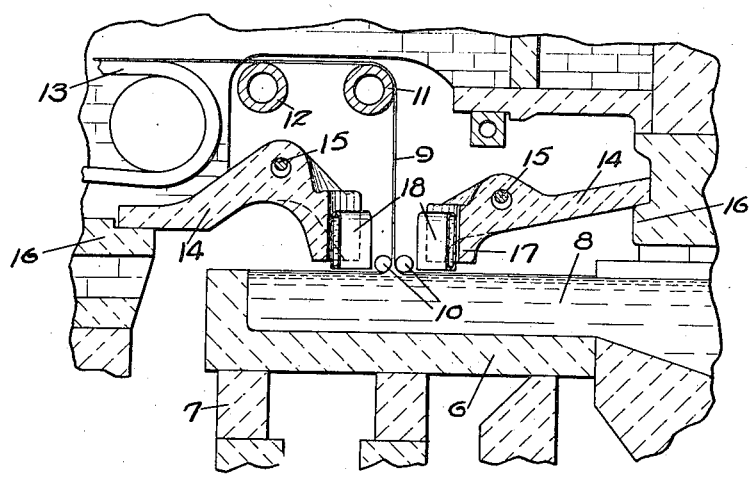

In the drawings wherein like numerals are employed to designate like parts throughout the same, Fig. 1 is a fragmentary vertical longitudinal section through a glass forming apparatus showing my improved construction.

Figure 2:
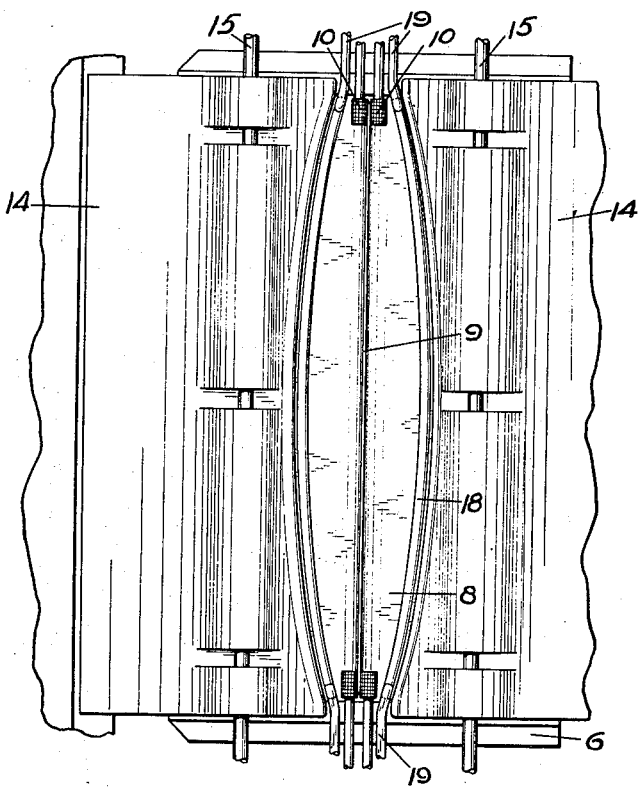

Fig. 2 is a top plan view thereof.

In the patent to Colburn 1,248,809, granted Dec. 4, 1917, a sheet of glass is continuously drawn from a pool of molten glass. The sheet is drawn for a short distance in the vertical plane, after which it is deflected and passed through a horizontal plane. The molten glass from which the sheet is drawn is contained within a draw pot which is arranged in open communication with a tank furnace, whereby the molten glass can be continuously replenished. Lip-tiles are arranged on both sides of the sheet, while water-cooled heat-absorbing shields are arranged between the lip-tiles and the sheet to prevent the heat and gases present around the furnace from striking the sheet and causing a breakdown or surface defects therein. The Colburn machine, as set forth in this patent, uses lip-tiles having straight lips, that is, the lips of the lip-tile and the sheet are equidistant throughout their entire lengths as are the heat-absorbing shields.

Molten glass has a tendency to adhere or stick to other bodies and this is particularly true of the refractory clay blocks which are used to form draw pots and tanks. As a consequence the border portions of the molten glass moving toward the point of draw are retarded so that the central portion of the flow of glass moves relatively faster than the border portions. The Colburn machine makes use of a so-called surface draw which means that the outer surfaces of the sheet are formed from glass drawn from the surface of the molten source of supply. The atmosphere contacting with the surface glass in the draw pot between the heat-absorbing coolers or shields and the sheet has a noticeable bearing upon the sheet drawn. Obviously, if the glass flowing along the border portions of the tank and pot is moving slower than the remainder of the glass, with a consequent reduction in temperature, the atmospheric exposure between the shields and the sheet should be less near the ends of the sheet than at the center thereof to equalize, as far as possible, the uneven and unequal temperature and flow conditions which are created by the natural retardation of the glass along the borders.

It is an aim of the present invention to provide a lip-tile and heat-absorbing shield that will permit an exposure to the atmosphere in a manner that a greater heat absorption takes place near the center of the sheet than at its ends.

In the drawings, the numeral 5 designates a portion of a tank furnace arranged in open communication with a draw pot 6 which may be supported upon suitable stools 7 contained in a compartment whereby the bottom of the pot may be heated. A source of molten glass 8 is continuously supplied to the draw pot 6 from the tank furnace 5.

A sheet 9 may be continuously drawn from a source of glass 8 and is preferably held against narrowing by means of knurl rolls 10 engaging the extreme border portions of the sheet as is clearly set forth in the Colburn patent mentioned. The sheet 9 is deflected over a bending roll 11 where it may be passed over an idler roll 12, draw table 13 and through an annealing leer which is not shown. Although the apparatus shown in the drawings and described is similar to that set forth in the Colburn patent, it is to be understood that the invention is not necessarily limited to this use or this machine.

Lip-tiles 14 are arranged above the glass 8 in the draw pot 6 and may be supported upon the rods 15 near one end while the opposite ends may rest upon suitable blocks 16. The lips 17 of the lip-tiles differ from the prior art constructions in that they are arcuated to present a vertical surface which is relatively further away from the center of the sheet 9 than at the ends thereof. Arcuated heat-absorbing shields 18 are used, the curvature of the shields being similar to the curvature of the lips 17. Conduits 19 are provided to permit a continuous passage of a cooling medium through the shields.

In use, the lower edges of the shields are disposed very close to the surface of the molten glass, the edges being relatively closer than the lower edges of the lip-tiles. It may be found necessary to adjust the shields vertically when a new supply of batch is being introduced within the tank furnace, this procedure being well known and understood in the art. The lip-tiles are so shaped that heat and gases moving toward the sheet will be deflected downwardly toward the molten glass, while the shields will prevent any injurious amount of heat and gases from passing in proximity to the sheet. As the atmospheric exposure of the molten glass between the coolers and the sheet has an important bearing on the thickness of sheet and quality of sheet drawn, it will be seen that with the acuated lip-tiles and shields greater exposure is offered to the central portion of the glass than at the edges. Obviously, as the central portion of the flow is relatively hotter than the border portions, greater heat absorption is needed at the center to permit the flow of glass to be uniform when it is drawn into the sheet. The exact curvature of the lip-tile and cooler is dependent upon the width of sheet being drawn, but in all cases the center of the coolers and lip-tiles should bow away from the sheet.

The shields may be tilted toward or away from the sheet for minute adjustments and for taking care of variations in the thickness of the sheet drawn.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. In sheet glass apparatus, including a mass of molten glass, means for drawing a sheet therefrom, and a curved heat-absorbing means arranged in proximity to the sheet, said member curving away from said sheet, from both sides toward the middle thereof.

2. In sheet glass apparatus, including a mass of molten glass, means for drawing a sheet therefrom, and a heat-absorbing means arranged near the surface of the glass from which the sheet is drawn, the ends of the heat-absorbing means being disposed relatively nearer the sheet than the middle thereof.

3. In sheet glass apparatus, including a mass of molten glass, means for drawing a sheet therefrom, an internally cooled shield for protecting the sheet from heat around the glass from which the sheet is drawn, said shield being shaped to expose the central portion of the molten glass to more of the atmosphere than the remainder of the flow.

4. In sheet glass apparatus, including a mass of molten glass, means for drawing a sheet therefrom, a heat-absorbing means for protecting the sheet from heat around the molten glass from which the sheet is drawn, said heat-absorbing means being shaped to expose the central portion of the molten glass to more of the atmosphere than the remainder of the flow.

5. In sheet glass apparatus, including a tank furnace and a mass of molten glass, means for drawing a sheet therefrom, a heat-absorbing shield for protecting the sheet from the heat and gases from said furnace, said shield being curved to expose more of the central portion of the molten glass to the atmosphere than the edge portions.

6. In sheet glass apparatus, including a mass of molten glass, means for drawing a sheet therefrom, a lip-tile having a curved portion and a curved heat-absorbing means cooperative with the lip-tile and being bowed away from said sheet.

7. In sheet glass apparatus, including a mass of molten glass, means for drawing a sheet therefrom, a curved lip-tile and a curved heat shield associated with lip-tile, the central portion of the shield being relatively further from the sheet than the ends thereof.

8. In sheet glass apparatus, including a tank furnace, and a mass of molten glass, means for drawing a sheet therefrom, a lip-tile arranged in proximity to the sheet, the lip thereof being curved away from the sheet, and a cooler rested in said curved lip.

9. In sheet glass apparatus including a tank furnace and a mass of molten glass, means for drawing a sheet therefrom, and an internally cooled shield, said shield being curved away from said sheet from both sides toward the middle thereof.

10. In sheet glass apparatus including a tank furnace and a mass of molten glass, means for drawing a sheet therefrom, and a cooler arranged in proximity to the sheet, said cooler being curved away from said sheet from both sides toward the middle thereof.

Signed at Toledo, in the county of Lucas, and State of Ohio, this 16th day of October, 1925.

JOHN L. DRAKE.